United States Patent
Tsukidate et al.

(10) Patent No.: US 6,414,720 B1
(45) Date of Patent: Jul. 2, 2002

(54) DIGITAL BROADCASTING SYSTEM USING VIRTUAL CHANNELS

(75) Inventors: Ryota Tsukidate, Tokyo; Kenichi Fujita, Kawasaki; Shigeki Kaneko, Funabashi; Yoshiyasu Takeuchi, Tokyo, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/599,552

(22) Filed: Jun. 23, 2000

Related U.S. Application Data

(63) Continuation of application No. 08/956,585, filed on Oct. 23, 1997.

(30) Foreign Application Priority Data

Oct. 23, 1996 (JP) ............................................. 8-279756

(51) Int. Cl.[7] .......................... H04N 11/04; H04N 7/04; H04L 12/56; H04J 1/00
(52) U.S. Cl. ...................... 348/469; 348/423; 348/426; 348/906; 725/144; 725/146; 725/147; 725/114; 725/116; 725/138; 370/486; 370/397; 370/399; 370/409
(58) Field of Search ................................. 348/469, 423, 348/426, 906; 725/144, 146, 147, 138, 114, 116, 117; 370/486, 397, 399, 409

(56) References Cited

U.S. PATENT DOCUMENTS

| | | | |
|---|---|---|---|
| 5,200,823 A | 4/1993 | Yoneda et al. | 358/146 |
| 5,400,401 A | 3/1995 | Wasilewski et al. | 348/473 |
| 5,418,782 A | 5/1995 | Wasilewski | 348/906 |
| 5,425,101 A | 6/1995 | Woo et al. | 380/23 |
| 5,485,221 A | 1/1996 | Banker et al. | 348/563 |
| 5,534,941 A | 7/1996 | Sie et al. | 348/6 |
| 5,600,378 A * | 2/1997 | Wasilewski | 348/468 |
| 5,642,153 A | 6/1997 | Chaney et al. | 348/7 |
| 5,734,589 A | 3/1998 | Kosterski et al. | 364/514 |
| 5,864,358 A * | 1/1999 | Suzuki et al. | 348/10 |
| 5,886,995 A * | 3/1999 | Arsenault et al. | 370/477 |

FOREIGN PATENT DOCUMENTS

EP 0508654 10/1992

OTHER PUBLICATIONS

ATSC Standard, System, Information for Digital Television (Annex B); Jan. 30, 1996; pp. 63–71.

* cited by examiner

Primary Examiner—Reinhard J. Eisenzopf
Assistant Examiner—Paulos Natnael
(74) Attorney, Agent, or Firm—Israel Gopstein Clark & Brody

(57) ABSTRACT

A digital broadcasting system capable of causing any of physical channels selected by a broadcaster to be received as one of the channels available to users which is different from the physical channel selected by the broadcaster. For each of programs of each of the channels available to said users, a program information record comprising PSI (program specific information) is stored in a data base. The broadcaster is permitted to include, in the PSI, channel mapping information whose mapping destination is a channel (or a program) to be received instead of the channel for which said program information is intended. The program information records is inserted in broadcast transport streams on schedule and, if necessary, immediately after the broadcaster have included the channel mapping information in the PSI data.

11 Claims, 8 Drawing Sheets

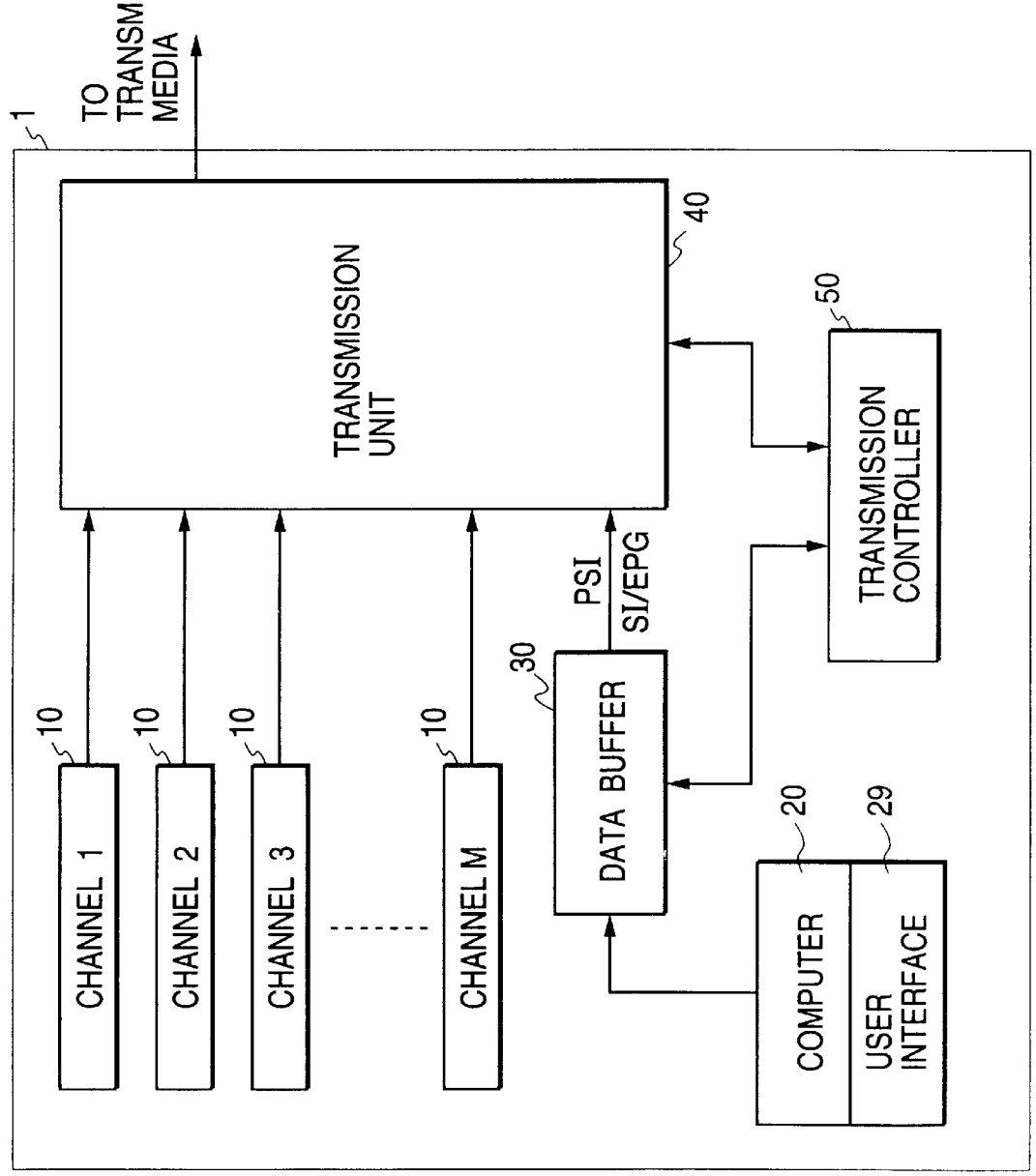

DIGITAL BROADCASTING SYSTEM USING VIRTUAL CHANNELS

This Appln is a cont of Ser. No. 08/956,585 filed Oct. 23, 1997

BACKGROUND OF THE INVENTION

1. Field of the Invention

The present invention relates to a digital broadcasting system which permits the users to receive a variety of services not only through a limited number of physical channels through which program data are actually transmitted but also through one or more virtual channels.

2. Description of the Prior Art

Virtual channels have been proposed in the ATSC (Advanced Television Systems Committee) standard published in 1996. According to the standard, virtual channels offer the user a constant view of services available on any particular transport stream (TS) compliant with the standard. The virtual channels are specified in the virtual channel table (VCT) whose records are transmitted with service data.

If a receiver used in a broadcasting system compliant-with the standard is turned on after such a long interval that the stored VCT is no longer effective, the normal operation of the receiver will not be guaranteed. Also, in the broadcasting system, any channel can be changed to another physical channel only in accordance with the timing defined in a VCT. However, the broadcaster may desire to change one or more channels to any other physical channel or a specific physical channel during ongoing programs of the one or more channels for some reason, e.g., alternative broadcasting in case of a trouble in any of program source systems in the broadcasting center or announcing the highlight of ongoing program of the specific physical channel.

It is therefore an object of the invention to provide a digital broadcasting system which utilizes virtual channels interchangeable at any time by frequently inserting channel shift information into each of the transport streams broadcast from a broadcasting center.

It is another object of the invention to provide some forms of digital broadcasting systems using virtual channels.

SUMMARY OF THE INVENTION

A digital broadcasting system according to the principals of the invention can cause one of a number of physical channels selected by a broadcaster to be received as one of the channels available to users. For each of the programs of each of the channels available to said users, a program information record comprising PSI (program specific information) is stored in a data base. The broadcaster is permitted to include, in the PSI, channel mapping information (CMI) whose mapping destination is a channel (a program) to be received instead of a program for which said program information record is intended or a channel through which the program to be received is transmitted. In other words, a CMI includes either a program or a channel ID as mapping destination. The program information records is inserted in broadcast transport streams on schedule (i.e., at predetermined times for respective programs) and, if necessary, immediately after the broadcaster has included the channel mapping information in the PSI data.

Some strategies of selecting a series of programs for a virtual channel are proposed.

BRIEF DESCRIPTION OF THE DRAWING

Further objects and advantages of the present invention will be apparent from the following description of the preferred embodiments of the invention as illustrated in the accompanying drawing, in which:

FIG. 1 is a schematic block diagram showing an illustrative embodiment of a broadcasting center system in accordance with the principles of the invention;

FIG. 2 is a diagram showing the contents of a hard disc within the microcomputer 20 of FIG. 1;

Throughout the drawing, the same elements when shown in more than one figure are designated by the same reference numerals.

DETAILED DESCRIPTION OF THE PREFERRED EMBODIMENTS

Figure 3:
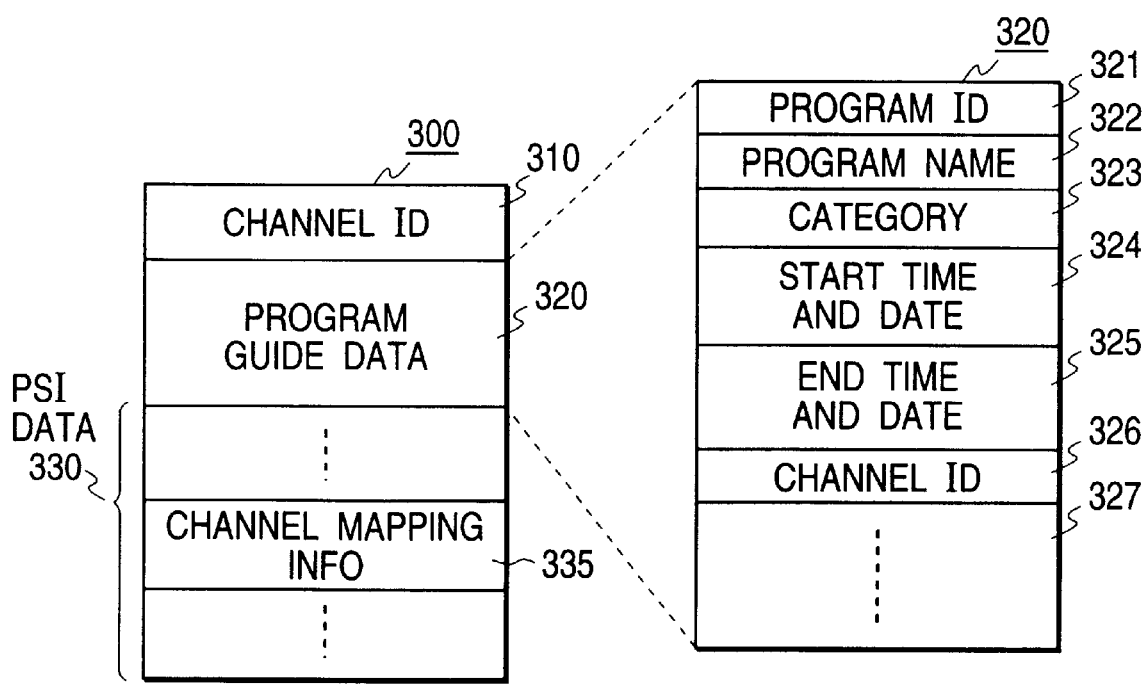
FIG. 3 is a schematic diagram showing an arrangement of a program information record.

FIG. 1 is a schematic block diagram showing an illustrative embodiment of a broadcasting center system in accordance with the principles of the invention. In FIG. 1, the broadcasting center system 1 comprises a plurality of M program source devices (CHANNELs 1 through M) 10 each providing a MPEG stream for a broadcasting program on air through the channel, a microcomputer 20 and user interface 29 for preparing and storing PSI (Program Specific Information described later) data and SI/EPG (Service Information/Electronic Program Guide) data, a data buffer 30 for supplying the PSI and SI/EPG data such that the launched data are multiplexed with the MPEG streams from the program source device 10, a transmission unit 40 for multiplexing the MPEG streams and the SI/EPG data into a plurality of N multiplexed MPEG transport streams (N<M), and a transmission controller 50 for controlling the data buffer 30 and the transmission unit 40. The microcomputer may be any suitable conventional computer. FIG. 2 is a diagram showing the contents of a hard disc within the microcomputer 20. The hard disc 21 at least stores a data base 22 of broadcasting program information, a DBMS (data base management system) 23 for creating and maintaining the data base 22, and a PSI and SI/EPG data compiler 24 for compiling data in the data base 22 into PSI data and SI/EPG data.

In operation, the operator of the system 1 creates and stores in the data base 22 a program information record for each of the programs in a predetermined period for each of the physical CHANNELs 1 through M and virtual channels, say, CHANNELs M+1, M+2, ..., M+V (V is the number of virtual channels and is equal to or larger than one). In this case, a physical channel (or virtual source) is an actual channel through which broadcasting data are transmitted from a real program source, whereas a virtual channel is an imaginary one but is listed as a program source in a program guide and provides the user with a constant view of programs selected from the programs of the physical channels.

FIG. 3 is a schematic diagram showing an arrangement of the above mentioned program information record. In FIG. 3, the program information record 300 comprises channel ID field 310, program guide data fields 320, and PSI data fields 330. This program information record 300 is created for each broadcasting program of each channel regardless of whether the channel is a physical one or virtual one. The channel ID field 310 contains an ID of the channel, i.e., CHi ($1 \leq i \leq M$ for a physical channel) or CHj ($M+1 \leq j \leq M+V$ for a virtual channel). The program guide data fields 320 contain a program ID 321, a program name 322, the category 323 of the program, start time and date 324, end time and date 325, a channel ID 326, and other descriptive data 327, which are transmitted in a SI/EPG packet. If the program in question is a virtual channel (e.g., CHj) program, then the program ID and other program guide data are the ID and corresponding data of the program of (physical) channel to be received instead of the program in question.

In a virtual channel (e.g., CHj) case, the PSI data fields 330 includes channel mapping information (CMI) 335 indicating that the channel (CHj) is to be mapped to the physical channel (e.g., CHi) through which the broadcasting program is actually transmitted. Doing this enables broadcasting programs of other channels or sources to be viewed (or listened) as if the broadcasting programs were broadcast by the virtual channel or source. In a physical channel case, the PSI data fields 330 contain conventional PSI data. However, there may be a case when even in a physical channel (e.g., CHh ($1 \leq h \leq M$)) case, the broadcaster wants the user to use other physical channel (e.g., CHi ($i \neq h$)) instead of CHh. In this case, the PSI data fields 330 will include a channel mapping information 335 for mapping CHh to CHi.

Figure 4:
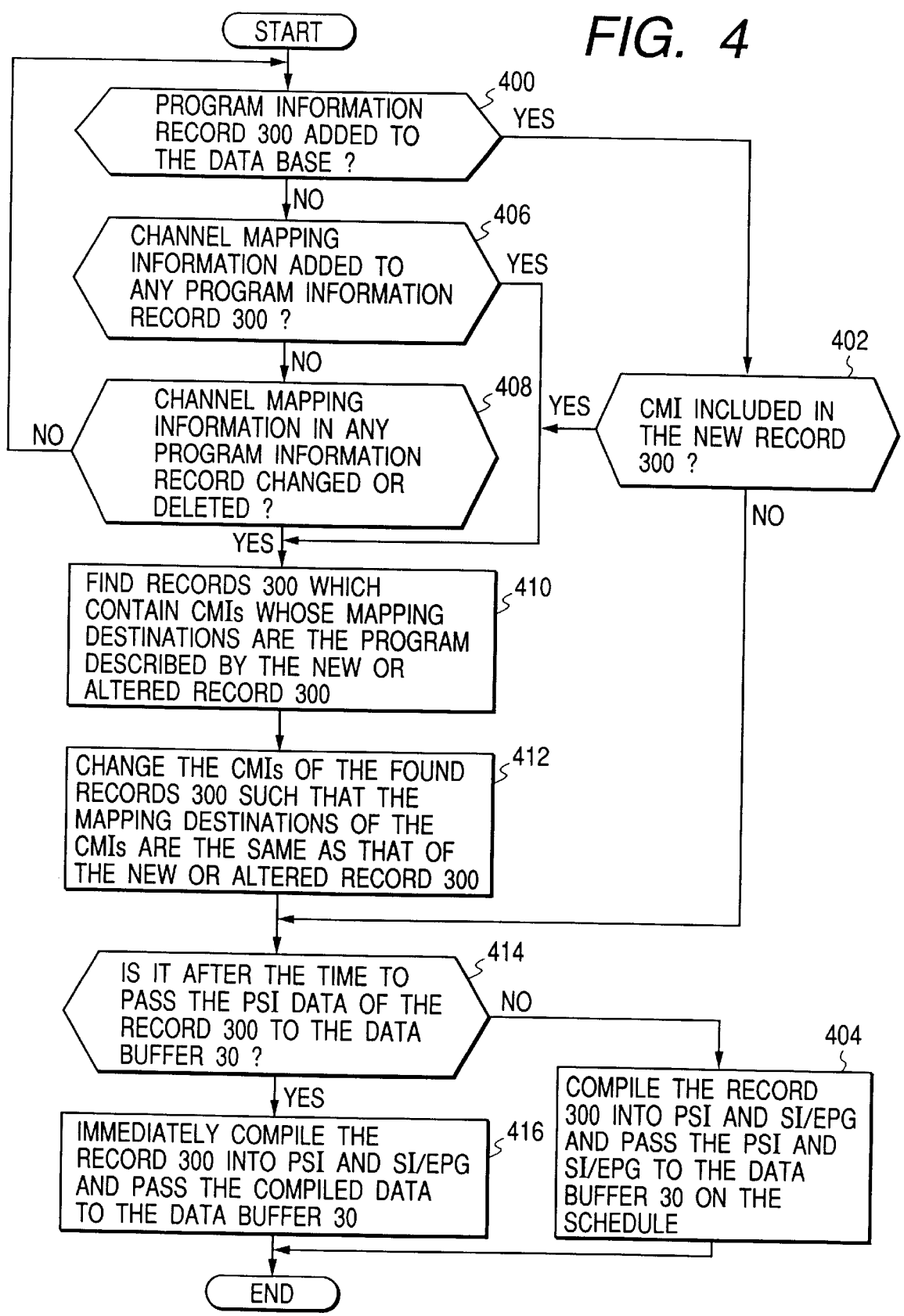
FIG. 4 is a flow chart showing the operation of the microcomputer 20 of FIG. 1 which is performed in response to an alteration to the data base 22.
Figure 5:
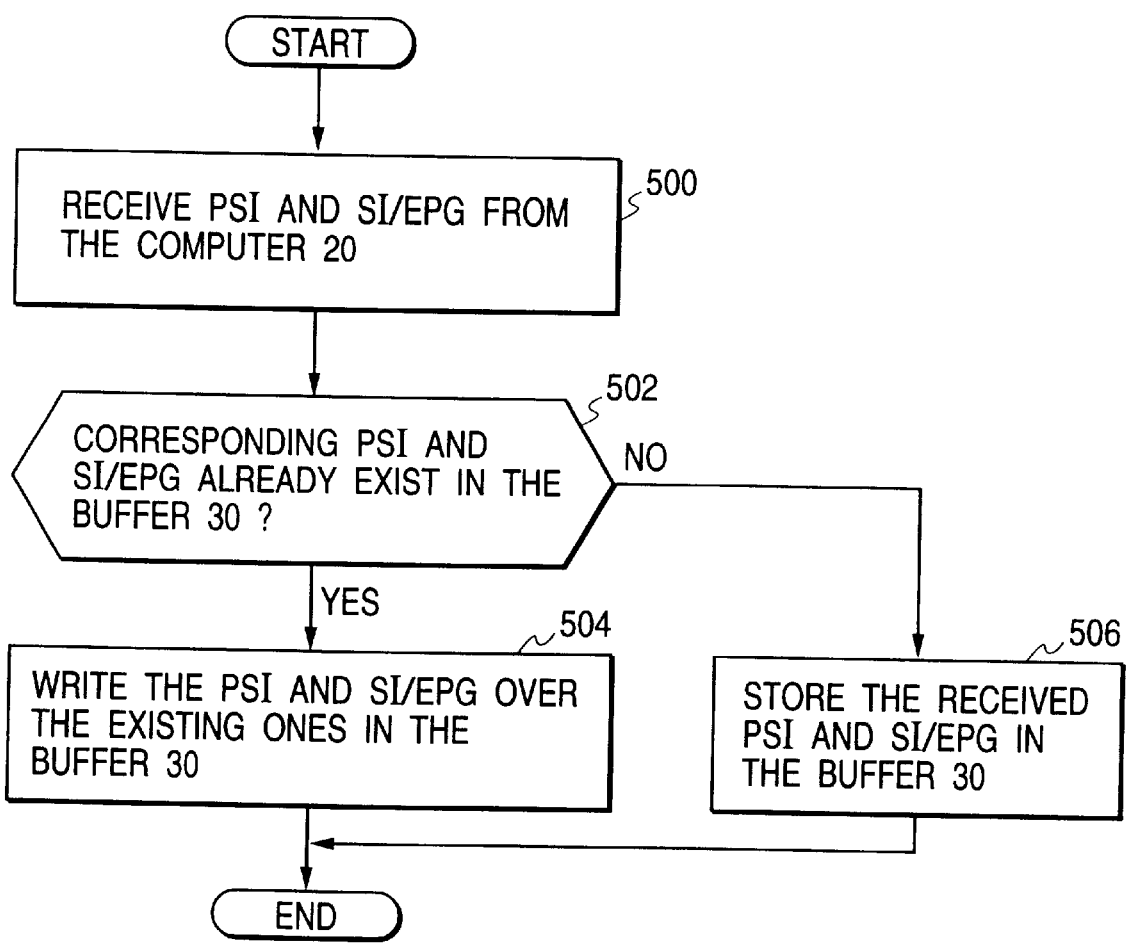
FIG. 5 is a flow chart showing the operation of the transmission controller 50 in controlling the data buffer 30 in response to a reception of PSI and SI/EPG data from the computer 20.

Thus created program information record 300 is stored once in the data base 23. FIG. 4 is a flow chart showing the operation of programs which comprise the DBMS 23 and the PSI and SI/EPG compiler 24 and are executed by the microcomputer 20 of FIG. 1 in response to an alteration to the data base 22. FIG. 5 is a flow chart showing the operation of the transmission controller 50 in controlling the data buffer 30 in response to a reception of PSI and SI/EPG data from the computer 20. If any of an addition, an alteration and a deletion of program information record 300 is performed in the data base 22, the computer 20 enters the operation flow of FIG. 4.

If a new program information record 300 has been added to the data base 22 in step 400, the control is passed to step 402, where a test is made to see if the added or new record 300 contains a CMI. If not, then another test is made in step 414 to see if it is after the time to pass the PSI data of the altered record 300 to the data buffer 30. If so, the computer 20 immediately compiles the record 300 into PSI and SI/EPG and passes the compiled data to the data buffer 30 in step 416. Otherwise, the computer 20 compiles the record 300 into PSI and SI/EPG and passes the compiled data to the data buffer 30 on the schedule in step 404. After step 404 or 416, the microcomputer 20 ends the process. Then, in FIG. 5, since there is no corresponding PSI or SI/EPG in the data buffer 30 (in step 502), the controller 60 temporarily stores the received data in the data buffer 30 in step 506. The stored data in the buffer 30 are then passed to the transmission unit 40 on the schedule under the control of the transmission controller 50.

However, the broadcaster may desire to change a channel to any other or a specific physical channel during the ongoing program of the channel for some reason. For this purpose, the broadcaster is permitted not only to include a CMI 335 in a new program information record 300 but also to add a CMI 335 to any program information 300 stored in the data base 22 and/or to change or delete any channel mapping information in any program information 300 as long as the broadcasting of program specified by the program information 300 has not been finished. That is, if a CMI is included in the new record 300 in step 402, if a CMI has been added to any program information record 300 stored in the data base 22 in step 406, or if the CMI of any program information record 300 stored in the data base 22 has been changed or altered in step 408, the control is passed to step 410 to search the data base 22 for records 300 which contain CMIs whose mapping destinations are the program described by the new or altered record 300. Then, in step 412, the computer 20 changes the CMIs of the found records 300 such that the mapping destinations of the found record 300 CMIs are the same as that of the new record 300 and proceeds to step 414. In step 414 the computer 20 makes a test for each of the changed records 300 to see if it is after the time to pass the PSI data of the altered record 300 to the data buffer 30. If so, the computer 20 immediately compiles each record 300 into PSI and SI/EPG and passes the compiled data to the data buffer 30 in step 416. Otherwise, the computer 20 compiles each record 300 into PSI and SI/EPG and passes the compiled data to the data buffer 30 on the schedule in step 404. After step 404 or 416, the computer 20 ends the process.

In FIG. 5, in response to a reception of PSI and SI/EPG data from the computer 20, the transmission controller 50 makes a test in step 500 to see if there is, in the data buffer 30, PSI and SI/EPG for the same program that the received PSI is intended for. If so, the computer 20 writes the received PSI and SI/EPG over the existing ones in the buffer 30. Otherwise, the computer 20 stores the received PSI and SI/EPG in the buffer 30. By doing this, the broadcaster can change any channel to other channel substantially in real time.

In either case, the stored data in the buffer 30 are then passed to the transmission unit 40 on the schedule for multiplexing under the control of the transmission controller 50.

On the other hand, the M broadcasting data stream from the source device 10 are grouped and multiplexed into N time-division multiplexed transport streams (N<M) in the transmission unit 40 under the control of the transmission controller 50. In the multiplexing process, SI/EPG data and PSI data are inserted into the N transport streams in a well-known manner.

In this way, digital broadcasting services are provided not only through physical channels but also through virtual channels according to predetermined program schedules.

Figure 6:
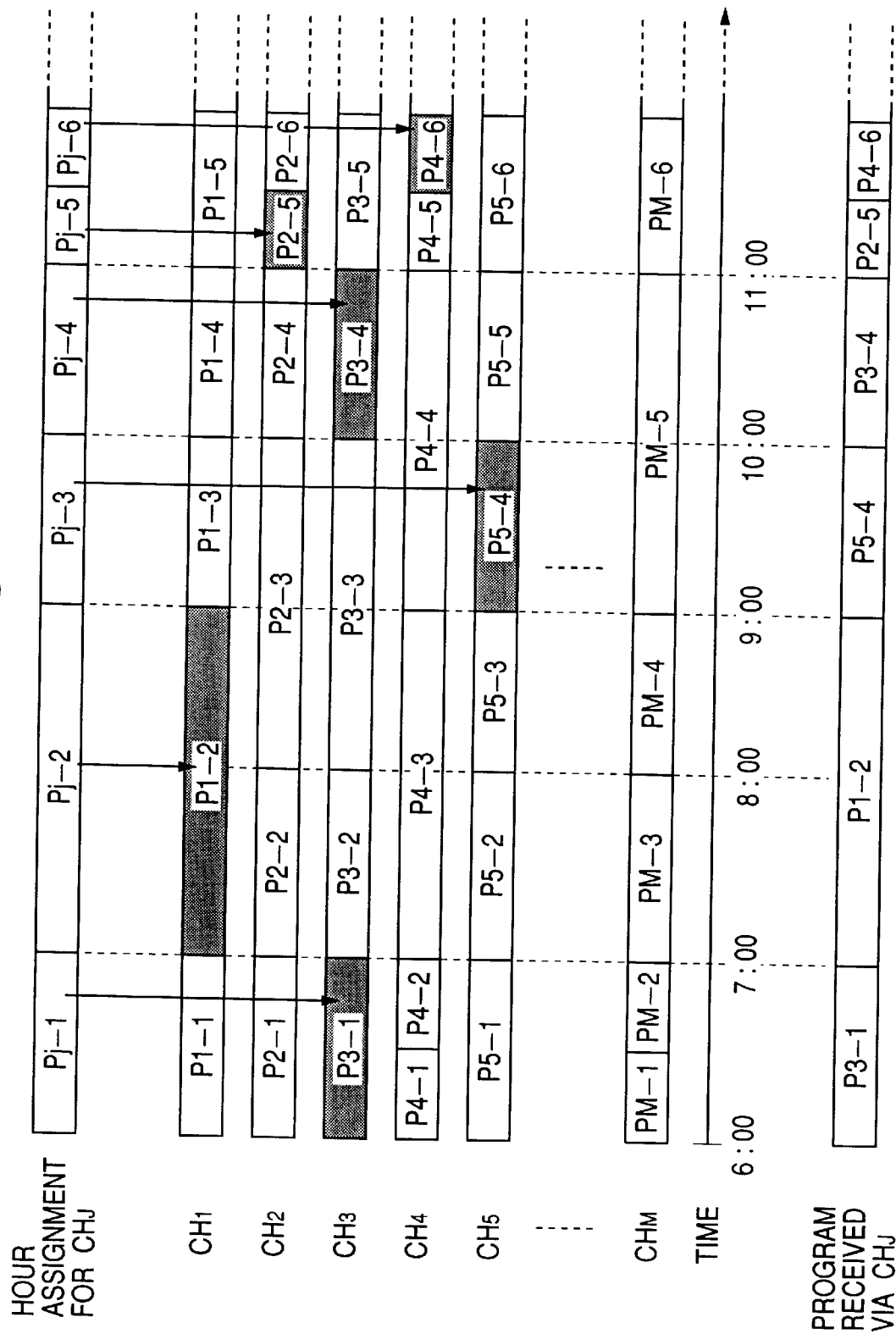
FIG. 6 is a diagram illustrating how a virtual channel $CH_j$ is configured from the physical channels $CH_1$ through $CH_M$.

FIG. 6 is a diagram illustrating how a virtual channel $CH_j$ is configured from the physical channels $CH_1$ through $CH_M$. It is assumed in FIG. 6 that the virtual channel $CH_j$ has 6:00–7:00, 7:00–9:00, 9:00–10:00, 10:00–11:00, 11:00–11:30, . . . assigned thereto as program hours Pj-1, Pj-2, Pj-3, Pj-4, Pj-5, . . . , respectively, after 6:00 of some day and that the programs of some physical channel $CH_i$ ($1 \leq i \leq M$) after 6:00 of the same day are Pi-1, Pi-2, Pi-3, . . . In this example, the program hours of the virtual channel $CH_j$ are mapped to physical channel programs as shown in the following table.

TABLE

| Start Time | CH$_j$ Program Hours (Imaginary Programs) | Substitution Programs |
|---|---|---|
| 6:00 | Pj-1 | P3-1 |
| 7:00 | Pj-2 | P1-2 |
| 9:00 | Pj-3 | P5-4 |
| 10:00 | Pj-4 | P3-4 |
| 11:00 | Pj-5 | P2-5 |
| 11:30 | Pj-6 | P4-6 |
| . | . | . |
| . | . | . |
| . | . | . |

Specifically, the PSI data transmitted for CH$_j$ during the time period from 6:00 to 7:00 includes data indicative of the channel CH$_3$ or the program P3-1 as the channel mapping information 335, similarly the CH$_j$ PSI data from 7:00 to 9:00 includes data indicative of CH$_1$ or P1-2, the CH$_j$ PSI data from 9:00 to 10:00 includes data indicative of CH$_5$ or P5-4, and so on. In other words, each of the vertical arrows of FIG. 6 shows a channel mapping information which is stored in the PSI associated with the program where the arrow is originating and which indicates that the arrow originating program is mapped to the program pointed by the arrow, i.e., the channel pointed by the arrow is received.

(A program used as a virtual program (shown as pointed by an arrow in FIGS. 6 and 7) is hereinafter referred to as a "substitution program" and a physical channel carrying such a substitution program is referred to as a "substitution channel".)

Figure 7:
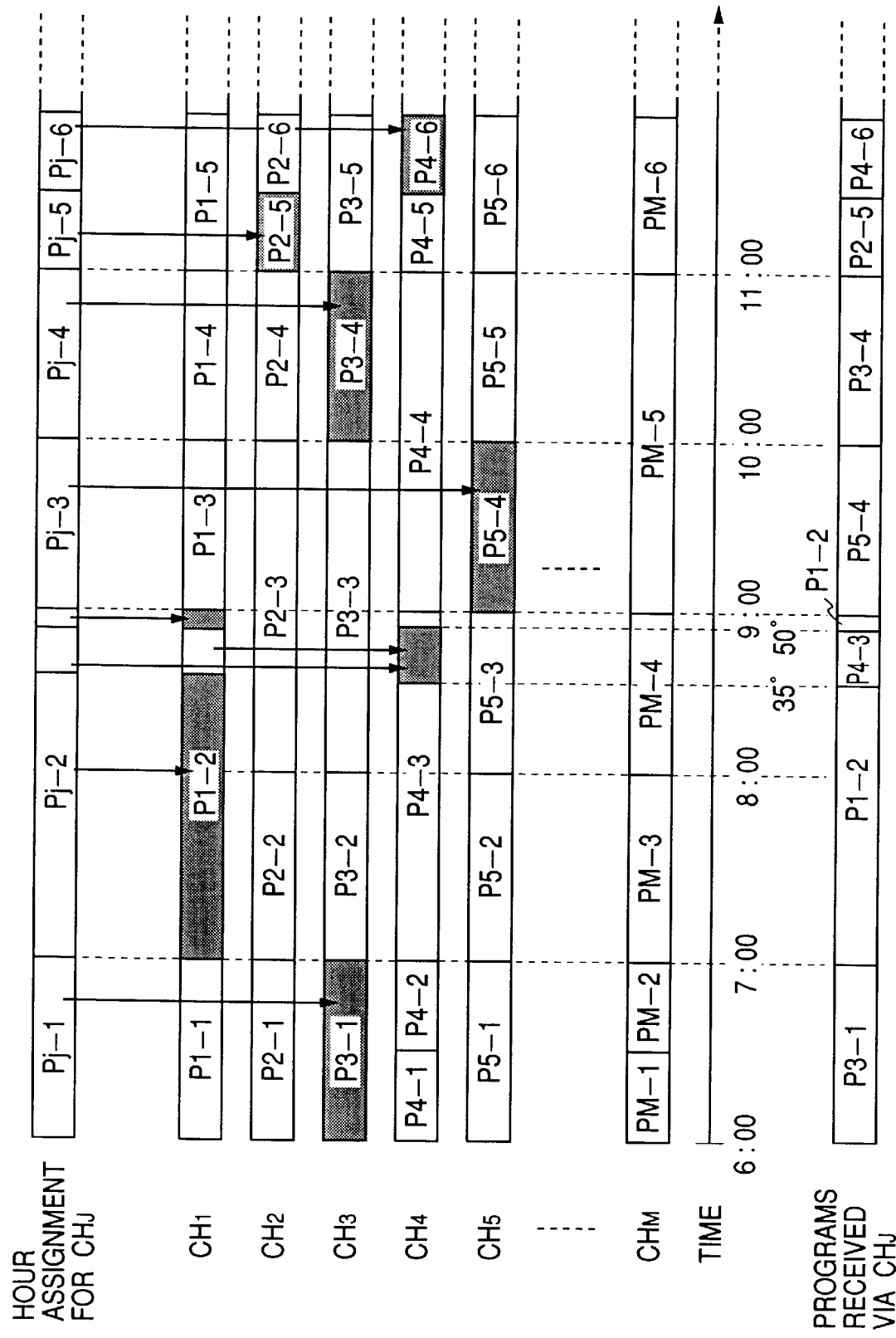
FIG. 7 is a diagram showing an exemplary channel mapping state in which the physical channel $CH_1$ is further mapped to the physical channel $CH_4$ during a period from about 8:35 to 8:50 in a situation (or a program configuration) shown in FIG. 6.

FIG. 7 is a diagram showing an exemplary channel mapping state in case when the physical channel CH$_1$ is further mapped to the physical channel CH$_4$ during a period from about 8:35 to 8:50 in a situation (or a program configuration) shown in FIG. 6. The channel mapping state of FIG. 7 is identical to that of FIG. 6 except that the physical channel CH$_1$ is mapped to the physical channel CH$_4$ during a period from about 8:35 to 8:50. However, it should be noted that the channel CH$_j$ or Pj-2 has been already mapped to the channel CH$_1$ or P1-2. In this case, two mapping ways concerning the channel CH$_j$ are possible for the period from 8:35 to 8:50. One is to map CH$_j$ to CH$_1$ during the period as well as the other period of Pj-2, thereby double-mapping CH$_j$ to CH$_1$ and then to CH$_4$. The other is to map CH$_j$ directly to CH$_4$. In order to avoid making the receiver structure complicated, the latter mapping way has been used in this illustrative embodiment.

In this way, if a substitution program for some program (an original program) is to be further mapped to another substitution program (a second substitution program), then the channel mapping information (CMI) of the original program is changed such that the mapping destination of the CMI of the original program is the second substitution program. For example, if CH$_1$ (or P1-2) is mapped to CH$_4$ (or P4-3) during the period from 8:35 to 8:50 in a state shown in FIG. 6, then the mapping destination of the CMI for CH$_j$ is changed from P1-2 to P4-3 only during the period.

Figure 8:
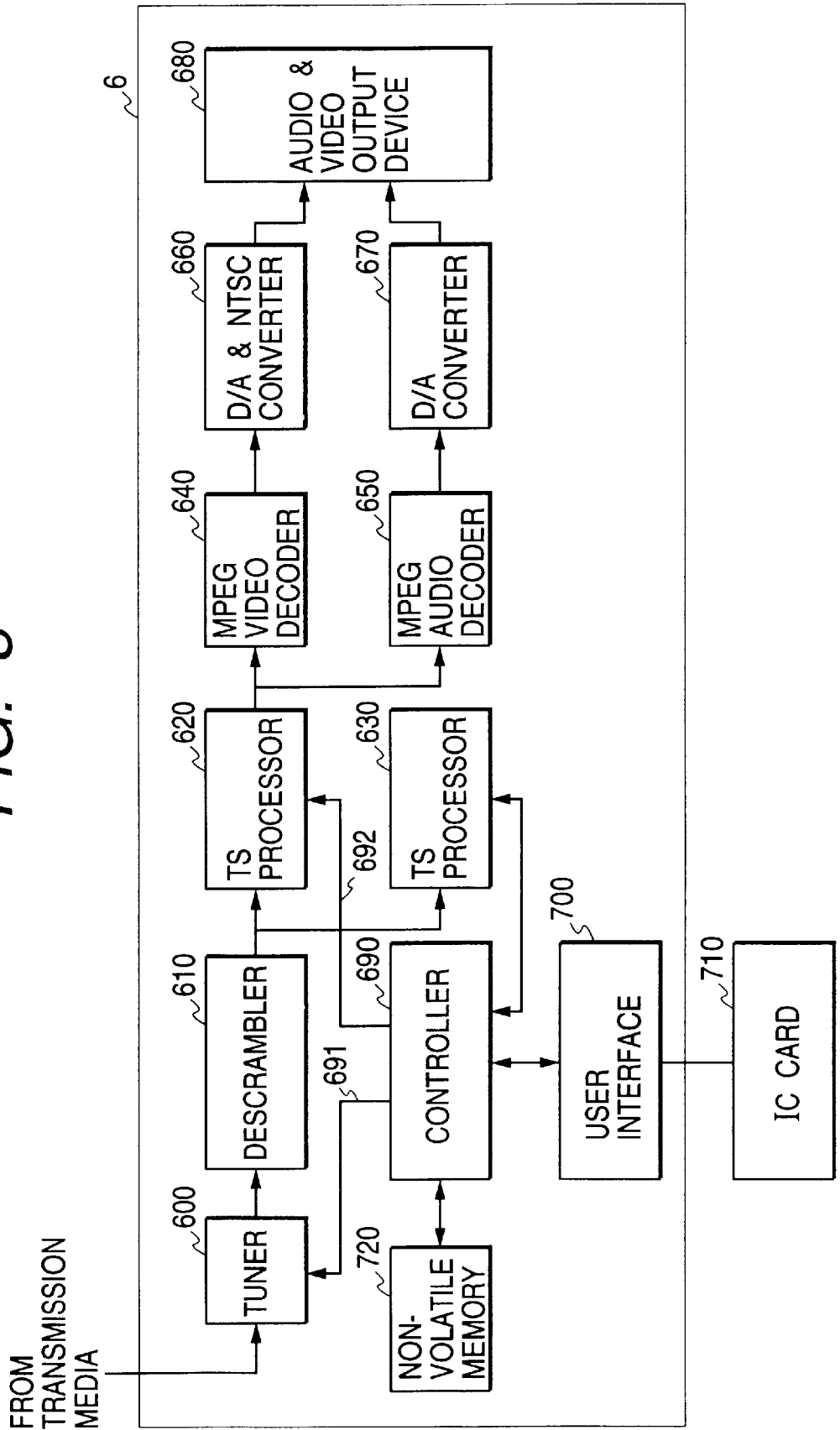
FIG. 8 is a schematic block diagram showing an arrangement of an illustrative embodiment of a receiver in accordance with the principles of the invention.

FIG. 8 is a schematic block diagram showing an arrangement of an illustrative embodiment of a receiver in accordance with the principles of the invention. In FIG. 8, the receiver 6 comprises a tuner 600; a descrambler 610 having the input thereof connected with the output of the tuner 600; TS (transport stream) processors 620 and 630 having the inputs thereof connected in common to the descrambler 610 output; an MPEG video decoder 640 and an MPEG audio decoder 650 having their inputs connected in common to the TS processor 620 output; a D/A and NTSC converter 660 having its input connected to the MPEG video decoder 640 output; a D/A converter 670 having its input connected to the MPEG audio decoder 650 output; video and audio output devices 680 having their inputs connected respectively to the D/A and NTSC converter 660 output and the D/A converter 670 output; a controller 690 for controlling the tuner 600 and the TS processor 620 through first and second control signals 691 and 692, respectively, on the basis of PSI data from the TS processor 630; a nonvolatile memory connected with the controller 690 for storing EPG data; and a user interface 700 connected with the controller 790 and comprising a display (not shown), a control panel (not shown) and an IC (integrated circuit) card interface (not shown) permitting an IC card 710 to be used. The nonvolatile memory 720 may be any suitable memory such as EEPROM (electrically erasable and programmable read only memory). If the receiver 6 is of a type having program (or application) storage capability, a hard disc may preferably be used for the nonvolatile memory 720. The user interface 700 may further comprise a remote controller interface (not shown) so as to permit the user to operate the receiver 6 by means of a remote controller.

In operation, transport streams (TSs) received from the transmission media is supplied to the tuner 600. The tuner 600 selects one of the TSs which is specified by the first control signal 691 from the controller 690 and demodulates the selected TS. The demodulated TS from the tuner 600 is descrambled with a key data stored in, for example, the IC card 710 by the descrambler 610 into an MPEG TS, which is supplied to the TS processors 620 and 630. The TS processor 620 extracts, from the MPEG TS, MPEG video and audio data for a channel specified by the second control signal 692 from the controller 690. The extracted MPEG video data is decoded by the MPEG video decoder 640 and converted into an NTSC signal by the D/A & NTSC converter 660. The extracted MPEG audio data is decoded by the MPEG audio decoder 650 and converted into an analog audio signal by the D/A converter 670. The NTSC signal and the analog audio signal are supplied to the audio & video output devices 680.

On the other hand, the TS processor 630 extracts the channel ID 310, program guide data 320 and PSI data 330 for the channel specified by the controller 690 (which is identical to the channel selected by the user) from the MPEG TS from the descrambler 610 and passes the extracted data 310, 320 and 330 to the controller 690. Then the controller 690 examines the CMI 335 of the PSI data 330. If there is no CMI in the PSI data 330, then the controller 690 controls the tuner 600 and the TS processor 620 to receive the channel directly identified by the user-selected channel. If the PSI data 330 includes CMI 335, then the controller 690 controls the tuner 600 to select the TS including the channel identified as the mapping destination in the CMI 335 and the TS processor 620 to extract the channel from the received TS.

For example, if the channel CH$_j$ is selected by the user in a period from 6:00 to 7:00, then the controller will find, in the PSI data 330, a CMI 335 whose mapping destination is CH$_3$ (or P3-1) and accordingly sends a code specifying the TS including CH$_3$ and a code specifying the channel CH$_3$ to the tuner 600 and the TS processor 620, respectively. Similarly, if the channel CH$_j$ is selected by the user in a period from 8:35 to 8:50 for example (in FIG. 7), then the controller will find, in the PSI data 330, a CMI 335 whose mapping destination is CH$_4$ (or P4-3) and accordingly sends a code specifying the TS including CH$_4$ and a code specifying the channel $CH_4$ to the tuner 600 and the TS processor 620, respectively.

In this way, a channel $CH_j$ permits the user to receive programs P3-1, P1-2, P4-3, P1-2, P5-4, P3-4, P2-5, P4-6 and so on as if the programs were actually transmitted via the channel $CH_j$.

Application Examples of Virtual Channels

There are various ways of selecting a series of programs for a virtual channel. Some selecting strategies will be given in the following.

A channel comprising programs of a specialized category such as news, sports or movies can be easily organized from a limited number of ordinary program sources, and vice versa, thereby increasing the number of channels.

It is also possible to make a channel comprising the most popular or the top-rated programs.

Figure 9:
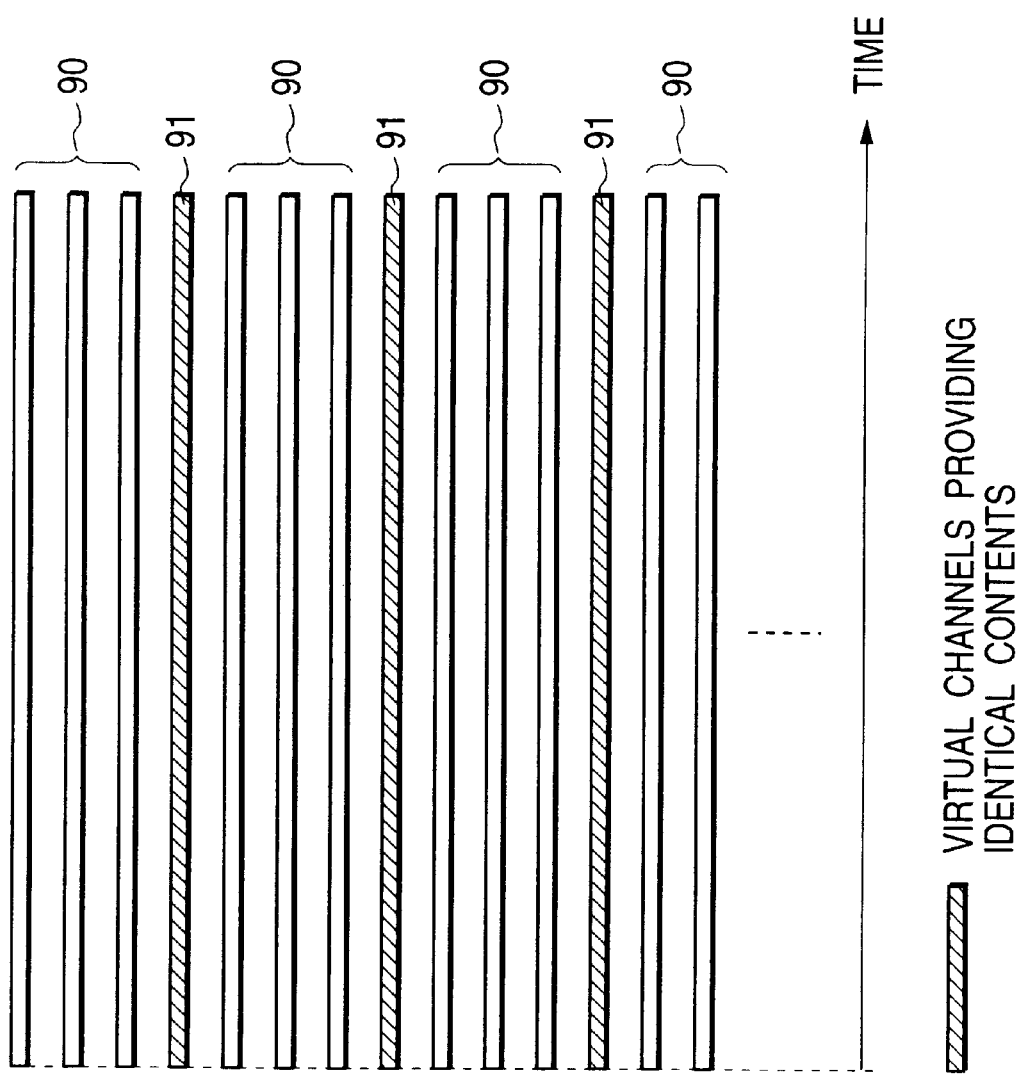
FIG. 9 is a diagram showing an exemplary channel configuration broadcast from a broadcasting center in accordance with the principles of the invention.

FIG. 9 is a diagram showing an exemplary channel configuration broadcast from a broadcasting center in accordance with the principles of the invention. In FIG. 9, the channel configuration comprises a lot of channels 90 broadcast from ordinary intention and a plurality of virtual channels 91 having identical contents to each other. The virtual channels 91 are so arranged that the virtual channels 91 will appear repeatedly in a relatively short period when the channels 90 and 91 are swept by the user. By doing this, the broadcaster can cause the virtual channels 91 such as a promotion channel to be received when the user changes the channels continuously.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digital broadcasting system capable of causing one of physical channels selected by a broadcaster to be received as one of the channels available to users; the system comprising:

means for storing, for each of programs of each of said channels available to said users, a program information record comprising PSI (program specific information);

means for permitting the broadcaster to include, in said PSI, channel mapping information whose mapping designation is a program to be received instead of a program for which said program information record is intended or a channel through which said program to be received is transmitted;

means, responsive to a determination that PSI data for said program to be received includes channel mapping information indicative of a third program or channel to be received, for changing said channel mapping information such that the mapping destination of said channel mapping information is said third program or channel; and means for inserting said program information records in broadcast transport streams on schedule.

2. A system as defined in claim 1, wherein:

said program information record further comprises channel ID of said channel selected by said user and program guide data for either the program for which said program information record is intended for or the program identified by said mapping destination of said channel mapping information of said PSI data depending on whether said PSI includes said channel mapping information, and the system further comprises means for inserting said program information records in said broadcast transport streams.

3. A system as defined in claim 1, wherein said channels, through which said programs including said program information record flow, consistently lead from a particular broadcast station to a particular receiving station.

4. In a digital broadcasting system in which a broadcasting center provides broadcast services through a plurality of physical channels which actually transmit service programs, a method for causing one of the physical channels selected by a broadcaster to be received as one of the channels available to users; the method comprising the steps of:

storing, for each of programs of each of said channels available to said users, a program information record comprising PSI (program specific information);

including, in said PSI for a program said broadcaster desires to be received, channel mapping information whose mapping destination is a program to be received instead of a program for which said program information record is intended or a channel through which said program to be received is transmitted;

if PSI data for said program to be received includes channel mapping information indicative of a third program or channel to be received, changing said channel mapping information such that the mapping destination of said channel mapping information is said third program or channel; and inserting said program information records in broadcast transport streams on schedule.

5. A method as defined in claim 4, wherein said step of including channel mapping information comprises the step of including channel mapping information whose mapping destination is a top-rated program or a channel transmitting said top-rated program.

6. A method as defined in claim 4, wherein said step of including channel mapping information comprises the step of including channel mapping information whose mapping destination is a program of a specific category or a channel transmitting said program of said specific category.

7. A method as defined in claim 4, wherein said channels which actually transmit said service programs consistently lead from a particular broadcast station to a particular receiving station.

8. In a digital broadcasting system in which a broadcasting center provides broadcast services through a plurality of physical channels which actually transmit service programs, a method for causing one of physical channels selected by a broadcaster to be received as one of the channels available to users; the method comprising the steps of:

storing, for each of programs of each of said channels available to said users, a program information record comprising PSI (program specific information);

including, in said PSI for a program said broadcaster desires to be received, channel mapping information whose mapping destination is a program to be received instead of a program for which said program information record is intended or a channel through which said program to be received is transmitted; and inserting said program information records in broadcast transport streams on schedule;

wherein said step of including channel mapping information comprises the step of, in the event one of the currently broadcast programs reaches a climax, including channel mapping information whose mapping destination is said one of the currently broadcast programs or a channel transmitting said one of the currently broadcast programs.

9. A method as defined in claim 8, wherein said channels which actually transmit said service programs consistently lead from a particular broadcasting center to a particular receiving station.

10. In a digital broadcasting system in which a broadcasting center provides broadcast services through a plurality of physical channels which actually transmit service programs, a method for causing a sequence of programs selected by a broadcaster from the physical channels to be received as if the sequence of programs were broadcast via a channel selected by a user; the method comprising the steps of:

assigning sequential channel IDs to the channels available to the users, permitting a plurality of channel IDs to be assigned to a virtual channel comprising said sequence of programs such that said virtual channel appears repeatedly in a relatively short period when said channels available to the users are swept by the users;

storing, for each program of said channel selected by said user, a program information record comprising PSI (program specific information);

including, in each of said PSIs, channel mapping information whose mapping destination is one of said physical channels (or said service programs) to be received as said channel for which said each of said PSIs is intended; and inserting each of said program information records in broadcast transport streams on schedule.

11. A method as defined in claim 10, wherein said channels which actually transmit said service programs consistently lead from a particular broadcasting center to a particular receiving station.

* * * * *